United States Patent [19]

Sun et al.

[11] Patent Number: 4,738,039
[45] Date of Patent: Apr. 19, 1988

[54] DETACHABLE POLYGONAL PICTURE FRAME

[76] Inventors: James Sun; Yung C. Chiang, both of No. 41-1, Ta Hu, Ta Kang Village, Kuei Shan Hsiang, Taoyuan Hsien, Taiwan

[21] Appl. No.: 896,178

[22] Filed: Aug. 12, 1986

[51] Int. Cl.⁴ .............................................. G09F 1/12
[52] U.S. Cl. ...................................... 40/152; 403/402
[58] Field of Search ...................... 40/152, 152.1, 155, 40/10 R, 156; 403/401, 402

[56] References Cited

U.S. PATENT DOCUMENTS

| | | | |
|---|---|---|---|
| 2,581,843 | 1/1952 | Edwards | 403/402 |
| 4,368,584 | 1/1983 | Logan | 40/152 |
| 4,428,135 | 1/1984 | Sobel | 40/155 |
| 4,438,578 | 3/1984 | Logan | 40/152 |
| 4,493,583 | 1/1985 | Wallace | 403/402 |
| 4,538,936 | 9/1985 | Zeidl | 403/402 |

FOREIGN PATENT DOCUMENTS

| | | | |
|---|---|---|---|
| 816971 | 7/1969 | Canada | 403/402 |
| 2559046 | 8/1985 | France | 403/402 |

Primary Examiner—John J. Wilson
Assistant Examiner—J. Hakomaki
Attorney, Agent, or Firm—Browdy and Neimark

[57] ABSTRACT

A polygonal frame comprising a plurality of framing pieces and the same number of assembly devices. Both ends of each framing piece are slanted so as to fit together with matching slanted framing pieces. The rear side of each framing piece is set with an oblong recess and a longitudinal slot on an appropriate position proximate to each end thereof. Each assembly device comprises: an L-shaped assembly plate which consists of an L-shaped plate portion, two inclined supporting blocks disposed under opposite sides of the plate portion, and an L-shaped supporting rail with each of its two ends connecting to the two opposite supporting blocks; two inclined fastening blocks, each having a lengthwise groove on its lower central portion and a threaded vertical hole to enable a screw to go through; and two screws for engaging with the fastening blocks. An assembly device is put into the recesses and slots set on each two abutting framing pieces, thereby assembling them together by transverse fastening force which is produced by the rising of fastening blocks against the framing pieces when each screw engaged with the fastening block is advanced.

1 Claim, 4 Drawing Sheets

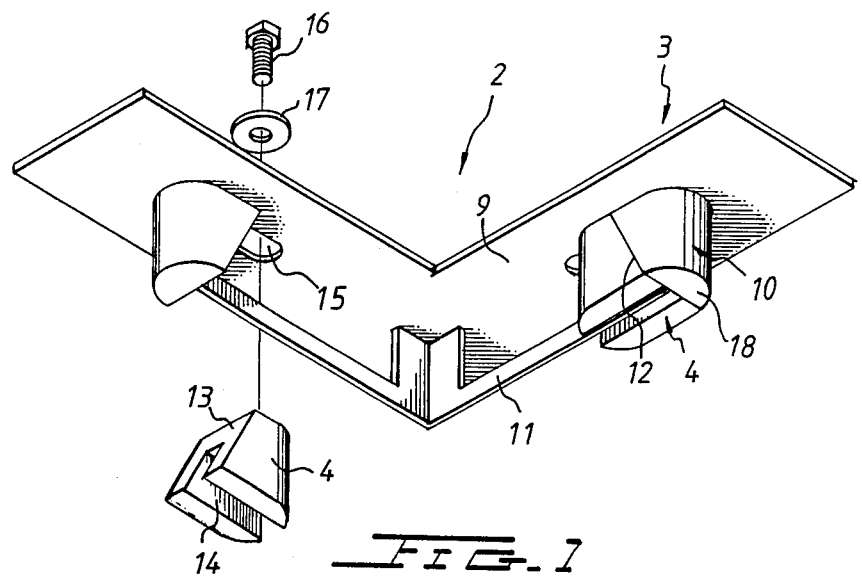
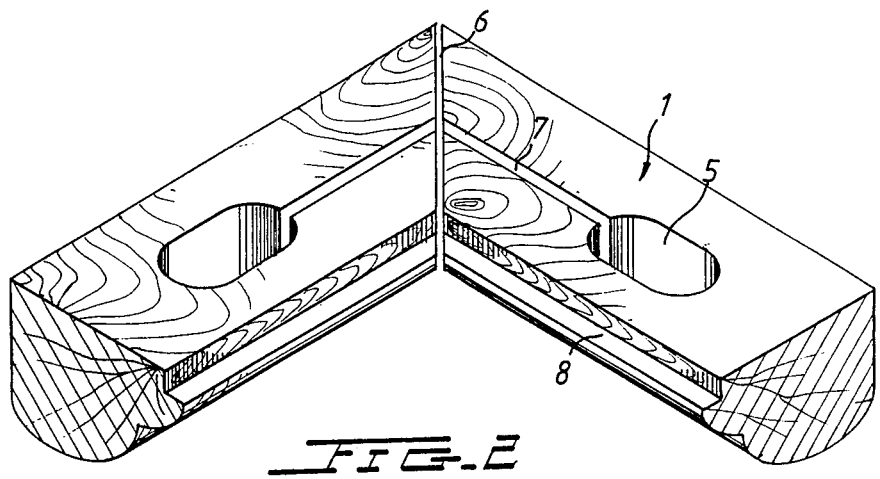

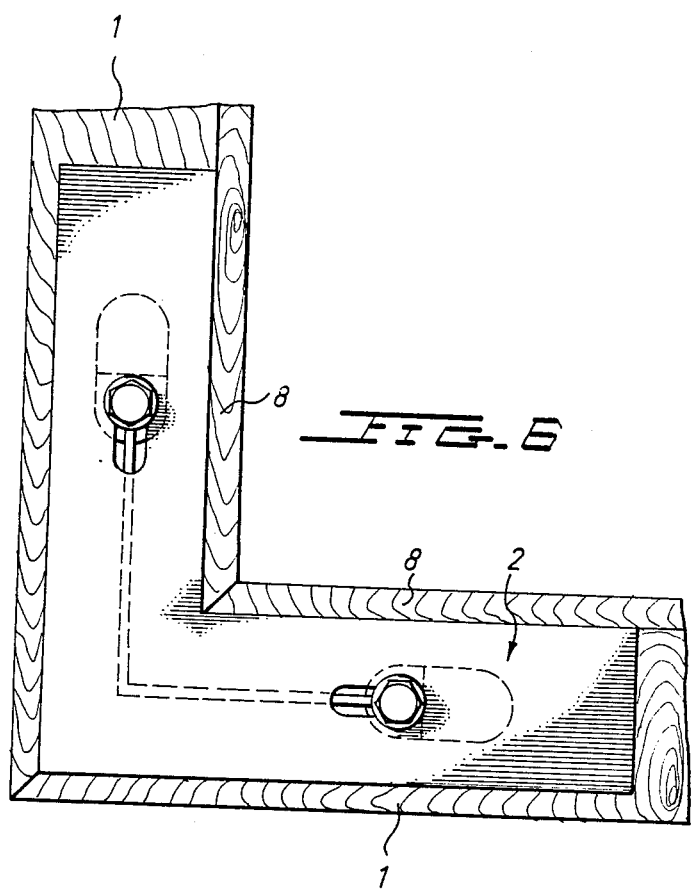
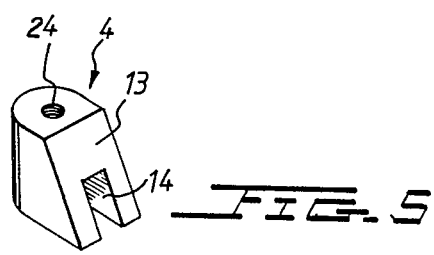

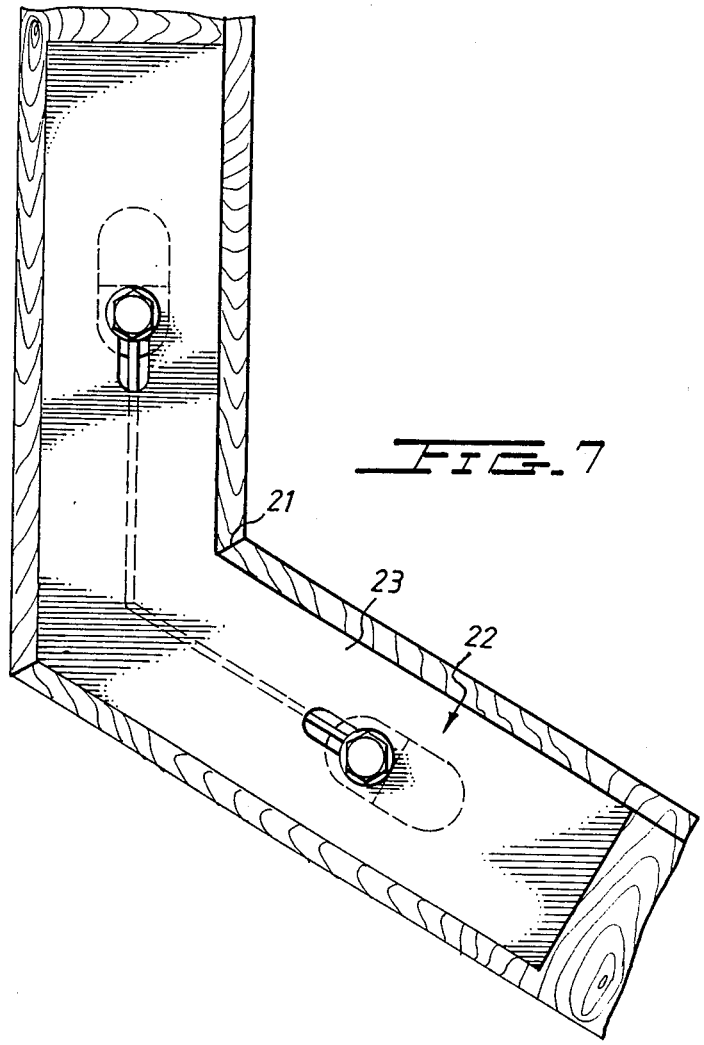

DETACHABLE POLYGONAL PICTURE FRAME

BACKGROUND OF THE INVENTION

The present invention relates to a detachable polygonal frame, particularly for large pictures or paintings, which comprises the same number of framing pieces as that of the sides of the polygonal frame. The framing pieces can be detachably assembled together by the same number of assembly devices applied on each corner between two abutting framing pieces.

Conventional polygonal frames used for ornamenting the pictures, paintings or the like are usually fixedly assembled by discrete framing pieces. The method most often used to assemble discrete framing pieces is to nail together the corners between two abutting pieces or to insert a key means coated with glue into the lengthwise slots set in the corners. However, when an especially large frame which has been assembled by the above-mentioned methods is to be disassembled into discrete pieces for transportation or storage purposes, it can hardly be done without permenently damaging the frame. Therefore, a detachable polygonal frame which can be assembled and disassembled, efficiently and easily, without tearing up the frame, is highly desirable.

SUMMARY OF THE INVENTION

A primary object of the present invention is to provide a detachable polygonal frame which comprises a plurality of framing pieces and the same number of assembly devices.

Another object of the present invention is to provide a detachable polygonal frame which can obviate and/or mitigate the above-mentioned disadvantages of the prior art.

Still another object of the present invention is to provide a detachable polygonal frame which can not only be easily and efficiently assembled by discrete framing pieces but can also be easily disassembled into pieces without tearing up the frame.

Further objects and advantages of the present invention will become apparent as the following description proceeds, and the features of novelty which characterize the invention be pointed out with particularity in the claims annexed to and forming a part of this invention.

BRIEF DESCRIPTION OF THE DRAWINGS

FIG. 1 shows a perspective view of an assembly device which is used to assemble square frames according to the present invention, wherein one fastening block and a screw are detached from the assembly plate for purposes of clarity;

FIG. 2 shows a perspective view of the rear face of two abutting framing pieces according to the present invention, wherein each end near to the slant is set with an oblong recess and a slot;

FIG. 5 shows a perspective view of an assembly block, and the inclined surface and lengthwise slot thereof according to the present invention;

FIG. 6 shows a plan view of one corner of a square frame according to the present invention;

FIG. 7 shows a plan view of one corner of a hexagonal frame, which is an embodiment according to the present invention.

DETAILED DESCRIPTION OF THE PREFERRED EMBODIMENT

Figure 3:
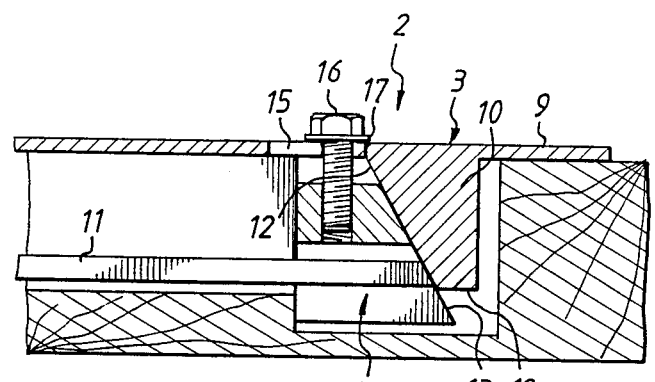
FIG. 3 shows a cross-sectional view of the detachable frame wherein the assembly device has not yet been fastened to the frame.

Referring to the drawings, in particular FIG. 1 and 2, it can be seen that the detachable square frame, an embodiment of a polygonal frame according to the present invention, comprises four framing pieces 1 (only two partial pieces are shown in FIG. 2), each having a 45 degree slant 6 on both ends thereof, and four assembly devices 2, each one consisting of an L-shaped assembly plate 3 and two separate fastening blocks 4.

On the rear face of the frame piece 1, there is an oblong recess 5 set near the slant 6 at each end thereof. There is a longitudinal slot 7 extending from the circumference proximate to the slant of the recess 5 to the slant 6. On the inner edge of the rear face of each framing piece 1, a longitudinal horizontal protrusion 8 is set for receiving a picture or the like.

The assembly plate 3 consisting of an L-shaped plate portion 9, two inclined supporting blocks 10 positioned in opposite sides of the rear face thereof, and an L-shaped supporting rail 11 is produced as one piece. The front face of the supporting block 10 attaches to the rear face of the plate portion 9. Each supporting block 10 is set with an inclined surface 12 facing to the corner of the plate 9. The end opposite to the inclined surface 12 of the supporting block 10 is semi-cylindrical so as to fit into the oblong recess 5. Each end of the L-shaped supporting rail 11 attaches to an appropriate lower position of the inclined surface 12 of the supporting block 10. The middle portion of the supporting rail 11 extends upwards so as to attach to the rear side of the plate portion 9.

Referring to FIGS. 1 and 5, it can be seen that the fastening block 4 also has an inclined surface 13 which matches (compliments) the corresponding inclined surface 12 of the supporting block 10. The end opposite to the inclined surface 13 of the fastening block 4 also has a semi-cylindrical edge which fits into the corresponding end of the oblong recess 5 proximate to slot 7. A lengthwise groove 14 with a width slightly larger than that of the supporting rail 11 is longitudinally set in the lower portion of the fastening block 4 to enable the rail 11 to go through. A threaded hole 24 is vertically set from the front face of the fastening block 4 to the groove 14 thereof. An oblong hole 15 for receiving a screw 16 is set on both sides of the L-shaped plate portion 9 at a position slightly closer to the corner than the supporting block 10 below.

Figure 4:
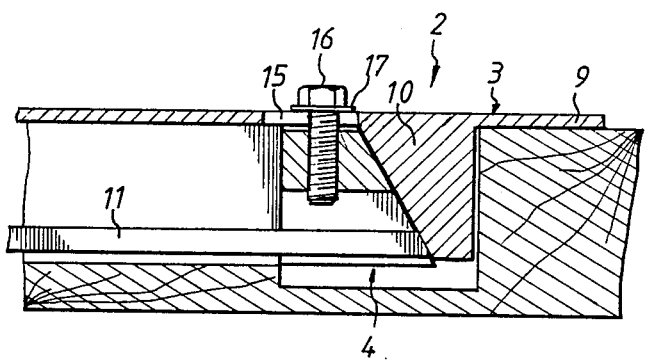
FIG. 4 shows the same piece shown in FIG. 3 wherein the assembly device is fastened to the frame.

Operationally, referring to FIGS. 3 and 4, it can be seen that first the two fastening blocks 4 are put on each of the two sides of the supporing rails 11 with its inclined surface 13 to contact the corresponding inclined surface 12 of the supporting blocks 10. Secondly, the whole assembly device 2 is placed into the corresponding slots 7 and recesses 5 of two framing pieces 1, which are abutted against each other along their 45 degree slants 6. When the assembly plate 2 is disposed into the slots 7 and the recesses 5, the rear 18 of the supporting block 10 doesn't reach the lower end of the recess 5 due to its proposed structure (see FIG. 3). Therefore, a space opposite from the corner of two abutting framing pieces exists in the recess 5 so as to facilitate the further fastening movement of the framing piece. Subsequently, a screw 16, preferably together with a washer 17, is secured to the fastening block 4 via the oblong hole 15 set on the plate portion 3. As a result of the screw 16 being engaged, the fastening block 4 is forced to close with the plate portion 3. However, due to the wedge structure of the fastening block 4 and the supporting block 10, the fastening block 4 will tend to move towards the side opposite to the slant 13, thereby providing the framing piece 1 with a transverse fastening force. The two abutting framing pieces 1 will be consequently fastened together when the screw 16 is adequately engaged with the fastening block 4 (see FIG. 4). If it is desired to detach the fastened framing pieces 1 from each other, the user only needs to loosen the eight screws 16 and subsequently remove the four assembly devices 2 from the four corners of the square frame.

Referring to FIG. 6, a front view of an embodiment of the present invention as described hereinbefore can be seen. However, the present invention is not limited to square frames. It may be applied on a wide range of polygonal frames. Referring to FIG. 7, another embodiment of the present invention, it can be seen that a hexagonal frame consists of six framing pieces, each of whose ends is set with a 60 degree slant 21, and six assembly devices 22, each having a plate portion 23 with an 120-degree intersection. The constitution and the operation, excepting the different degrees of slants and angles, of a detachable hexagonal frame according to the present invention are all the same as those of the above-mentioned square frame.

As various possible embodiments might be made of the above invention, and as various adaptations might be made in the embodiment above set forth, it is to be understood that all matter herein described or shown in the accompanying drawing is to be interpreted as illustrative and not in a limiting sense. Thus it will be appreciated that the drawings are exemplary of a preferred embodiment of the invention.

We claim:
1. A detachable polygonal frame comprising:
(a) a plurality of framing pieces, each of said framing pieces having a slant at two ends thereof with a specific angle so as to enable said framing pieces to match each other and form a polygonal frame; an oblong recess being set on an appropriate location near each said slant; a longitudinal slot being set parallel to said framing piece and running from a circumference of said recess to said slant;
(b) a plurality of L-shaped assembly plates with same number as said framing pieces; said assembly plate consisting of an L-shaped plate portion with an inclined supporting block and an oblong screw hole proximate to each side thereof; each of said supporting blocks having an inclined surface facing to a corner of said L-shaped plate portion and having a semi-cylindrical circumference on a side opposite to said inclined surface; an L-shaped supporting rail with either end thereof connecting to a lower position of said inclined surface of either of said supporting blocks; a middle portion of said supporting rail extending upwardly to connect a rear face of said L-shaped plate portion; and
(c) a plurality of fastening blocks, being double the number of said plurality of L-shaped assembly plates, each of said fastening blocks having an inclined surface matching said inclined surface of said supporting block; a lengthwise groove being longitudinally set on a lower portion of each of said fastening blocks; said fastening block being also set with a semi-cylindrical circumference opposite to said inclined surface thereof; a threaded hole being vertically provided on a front face of each said fastening block for receipt of a screw.

* * * * *